(12) United States Patent
Chen et al.

(10) Patent No.: US 12,223,110 B1
(45) Date of Patent: Feb. 11, 2025

(54) SECURE INTEGRATED CIRCUIT FOR SMART HAPTICS

(71) Applicant: Apple Inc., Cupertino, CA (US)

(72) Inventors: Denis G. Chen, San Jose, CA (US); Matthew T. Metzler, San Francisco, CA (US); Eric M. Innis, Hillsboro, OR (US); Darya Amin-Shahidi, Menlo Park, CA (US); Shingo Yoneoka, Saratoga, CA (US); Chi Kin Ho, Milpitas, CA (US); Adriane S. Niehaus, Saratoga, CA (US); Matthew N. Weege, Los Gatos, CA (US); Michael S. Weinstein, San Francisco, CA (US); Tristan R. Hudson, Campbell, CA (US); Parin Patel, San Jose, CA (US); Jonathan A. Gordon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 17/901,470

(22) Filed: Sep. 1, 2022

Related U.S. Application Data

(60) Provisional application No. 63/247,554, filed on Sep. 23, 2021.

(51) Int. Cl.
*G06F 3/01* (2006.01)
*G06F 3/041* (2006.01)

(52) U.S. Cl.
CPC ............ *G06F 3/016* (2013.01); *G06F 3/0414* (2013.01); *G06F 2203/04105* (2013.01)

(58) Field of Classification Search
CPC .................. G06F 3/016; G06F 3/0414; G06F 2203/04105
See application file for complete search history.

(56) References Cited

U.S. PATENT DOCUMENTS

| | | |
|---|---|---|
| 5,060,527 A | 10/1991 | Burgess |
| 5,912,533 A | 6/1999 | Lee et al. |
| 6,872,473 B2 | 3/2005 | Song et al. |
| 6,963,762 B2 | 11/2005 | Kaaresoja et al. |
| 7,148,623 B2 | 12/2006 | Vlaskin |
| 7,557,869 B2 | 7/2009 | Bang et al. |
| 8,026,987 B2 | 9/2011 | Choo et al. |

(Continued)

FOREIGN PATENT DOCUMENTS

| | | | | |
|---|---|---|---|---|
| CN | 102591512 A | * | 7/2012 | ............. G06F 3/016 |
| EP | 2000885 | | 12/2008 | |

*Primary Examiner* — Toan N Pham
*Assistant Examiner* — Mancil Littlejohn, Jr.
(74) *Attorney, Agent, or Firm* — Brownstein Hyatt Farber Schreck, LLP

(57) ABSTRACT

A software defined button includes a force sensor and a haptic output element. The button further includes an immutable logic core and a mutable logic core. The mutable logic core is configured to define one or more thresholds against which input received from the force sensor can be compared to determine whether a user input has been provided. The immutable logic core is configured to verify actual force input has been received when the mutable logic core signals that user input has been received. In response to receiving a verified force input, the haptic output element can be caused to be driven by one of the mutable or immutable logic cores to provide a haptic output to a user.

20 Claims, 8 Drawing Sheets

(56) References Cited

U.S. PATENT DOCUMENTS

| | | |
|---|---|---|
| 8,174,372 B2 | 5/2012 | da Costa |
| 8,310,043 B2 | 11/2012 | Lin et al. |
| 8,314,775 B2 | 11/2012 | Westerman |
| 8,405,618 B2 | 3/2013 | Colgate et al. |
| 8,416,209 B2 | 4/2013 | Hotelling et al. |
| 8,441,465 B2 | 5/2013 | Radivojevic |
| 8,466,366 B2 | 6/2013 | Srinivas |
| 8,564,550 B2 | 10/2013 | Hashimoto |
| 8,766,933 B2 | 7/2014 | Makinen et al. |
| 8,952,920 B2 | 2/2015 | Kuo et al. |
| 9,063,572 B2 | 6/2015 | Makinen et al. |
| 9,075,439 B2 | 7/2015 | Hong et al. |
| 9,098,113 B2 | 8/2015 | Brokken |
| 9,122,330 B2 | 9/2015 | Olivier et al. |
| 9,123,258 B2 | 9/2015 | Makinen et al. |
| 9,158,396 B2 | 10/2015 | Choi |
| 9,231,186 B2 | 1/2016 | Busgen |
| 9,304,636 B2 | 4/2016 | Burberry et al. |
| 9,395,851 B2 | 7/2016 | Mikladal et al. |
| 9,448,713 B2 | 9/2016 | Cruz-Hernandez et al. |
| 9,523,880 B2 | 12/2016 | Takizawa et al. |
| 9,524,064 B2 | 12/2016 | Kim et al. |
| 9,535,514 B2 | 1/2017 | Lim et al. |
| 9,579,690 B2 | 2/2017 | Beecher et al. |
| 9,600,070 B2 | 3/2017 | Chatterjee et al. |
| 9,612,674 B2 | 4/2017 | Degner et al. |
| 9,634,225 B2 | 4/2017 | Hubert et al. |
| 9,733,746 B2 | 8/2017 | Colgate et al. |
| 9,746,964 B2 | 8/2017 | Rosenberg |
| 9,829,979 B2 | 11/2017 | Brombach et al. |
| 9,875,625 B2 | 1/2018 | Khoshkava et al. |
| 9,880,623 B2 | 1/2018 | Lacroix et al. |
| 9,904,428 B2 | 2/2018 | Schardt |
| 9,910,535 B2 | 3/2018 | Kitada et al. |
| 9,914,851 B2 | 3/2018 | Woo et al. |
| 9,927,887 B2 | 3/2018 | Bulea |
| 9,939,900 B2 | 4/2018 | Cruz-Hernandez et al. |
| 9,965,037 B2 | 5/2018 | Hong et al. |
| 9,985,195 B2 | 5/2018 | Mori |
| 10,000,622 B2 | 6/2018 | Kumano et al. |
| 10,002,280 B1 | 6/2018 | Ramberg et al. |
| 10,031,582 B2 | 7/2018 | Modarres et al. |
| 10,038,154 B2 | 7/2018 | Lee |
| 10,042,468 B2 | 8/2018 | Kim et al. |
| 10,061,448 B2 | 8/2018 | Baek |
| 10,120,447 B2 | 11/2018 | Peshkin et al. |
| 10,147,868 B2 | 12/2018 | Ozawa |
| 10,208,158 B2 | 2/2019 | Banister et al. |
| 10,209,811 B2 | 2/2019 | Kim et al. |
| 10,248,211 B1 | 4/2019 | Van Ausdall et al. |
| 10,257,929 B2 | 4/2019 | Lim |
| 10,282,046 B2 | 5/2019 | Nathan et al. |
| 10,318,091 B2 | 6/2019 | Lee et al. |
| 10,331,211 B2 | 6/2019 | Lim et al. |
| 10,379,616 B2 | 8/2019 | Peshkin et al. |
| 10,379,655 B2 | 8/2019 | Colgate |
| 10,381,143 B2 | 8/2019 | Khoshkava et al. |
| 10,394,328 B2 | 8/2019 | Kang et al. |
| 10,416,768 B2 | 9/2019 | Khoshkava et al. |
| 10,416,772 B2 | 9/2019 | Sen et al. |
| 10,423,228 B2 | 9/2019 | Cherif et al. |
| 10,474,279 B2 | 11/2019 | Hwang et al. |
| 10,509,475 B2 | 12/2019 | Van Ausdall et al. |
| 10,537,490 B2 | 1/2020 | Rizzo |
| 10,564,723 B2 | 2/2020 | Kamata et al. |
| 10,564,746 B2 | 2/2020 | Lee et al. |
| 10,581,343 B2 | 3/2020 | Khoshkava |
| 10,585,482 B2 | 3/2020 | Wen et al. |
| 10,650,167 B2 | 5/2020 | Rizzo et al. |
| 10,705,610 B2 | 7/2020 | Colgate et al. |
| 10,712,854 B2 | 7/2020 | Akabane et al. |
| 10,727,287 B2 | 7/2020 | Takagi |
| 10,739,853 B2 | 8/2020 | Colgate et al. |
| 10,747,373 B2 | 8/2020 | Choi et al. |
| 10,775,890 B2 | 9/2020 | Wen et al. |
| 10,788,933 B2 | 9/2020 | Sugimoto et al. |
| 10,802,318 B2 | 10/2020 | Takeda et al. |
| 10,838,501 B2 | 11/2020 | Van Ausdall et al. |
| 11,073,934 B2 | 7/2021 | Wen et al. |
| 11,074,890 B2 | 7/2021 | Takahashi et al. |
| 11,371,961 B2 | 6/2022 | Buchanan et al. |
| 2004/0061691 A1 | 4/2004 | Gruber et al. |
| 2008/0018610 A1 | 1/2008 | Harmon et al. |
| 2008/0303795 A1 | 12/2008 | Lowles et al. |
| 2009/0135159 A1 | 5/2009 | Sun |
| 2010/0053087 A1 | 3/2010 | Dai et al. |
| 2010/0097323 A1 | 4/2010 | Edwards et al. |
| 2011/0134075 A1 | 6/2011 | Takusa |
| 2012/0112894 A1 | 5/2012 | Yang et al. |
| 2012/0126959 A1 | 5/2012 | Zarrabi et al. |
| 2012/0306790 A1 | 12/2012 | Kyung et al. |
| 2012/0327006 A1 | 12/2012 | Israr et al. |
| 2013/0016047 A1 | 1/2013 | Masumoto |
| 2013/0063394 A1 | 3/2013 | Wakuda |
| 2013/0277625 A1 | 10/2013 | Srinivas et al. |
| 2014/0192005 A1 | 7/2014 | Wakuda et al. |
| 2016/0124548 A1 | 5/2016 | Cherif et al. |
| 2016/0253040 A1 | 9/2016 | Lee et al. |
| 2016/0323267 A1* | 11/2016 | Sun .................. H04W 12/086 |
| 2016/0357342 A1 | 12/2016 | Olley et al. |
| 2017/0038904 A1 | 2/2017 | Murata |
| 2017/0364158 A1 | 12/2017 | Wen et al. |
| 2017/0364184 A1 | 12/2017 | Weinerth et al. |
| 2018/0081441 A1 | 3/2018 | Pedder et al. |
| 2018/0196548 A1 | 7/2018 | Kim et al. |
| 2018/0349585 A1* | 12/2018 | Ahn .................. H04W 12/068 |
| 2018/0364864 A9 | 12/2018 | Olley et al. |
| 2019/0138702 A1 | 5/2019 | Pan |
| 2020/0343902 A1* | 10/2020 | Stagg .................. H01H 13/803 |
| 2020/0401228 A1 | 12/2020 | Wen et al. |

\* cited by examiner

SECURE INTEGRATED CIRCUIT FOR SMART HAPTICS

CROSS-REFERENCE TO RELATED APPLICATION

This application is a nonprovisional and claims the benefit under 35 U.S.C. § 119(e) of U.S. Provisional Patent Application No. 63/247,554, filed Sep. 23, 2021, the contents of which are incorporated herein by reference as if fully disclosed herein.

TECHNICAL FIELD

Embodiments described herein generally relate to electronic devices having an input mechanism that may be used to receive user input and to generate haptic output in response to the received user inputs. More particularly, various embodiments described herein take a form of a personal electronic device, user equipment, or a system-on-chip that provides secure processing of the user input received, for example, at a button that is configurable as a software-defined button and generates a haptic output corresponding to the received user input.

BACKGROUND

An electronic device can include a physical input mechanism, such as a button, to receive user input from a user. The user may engage with the physical input mechanism to cause the electronic device to perform various functions, such as power cycling or authorizing a financial transaction.

However, if an electronic device is compromised (e.g., by malicious code), user input received by the physical input mechanism may be intercepted, modified, spoofed, and/or otherwise may not be interpreted properly by a central processor of the electronic device. In turn, an expected function may not be performed by the electronic device in response to the user input or, alternatively, spoofed user inputs can be generated (by the malicious code) thereby causing the electronic device and/or central processor to perform unintended functions. For certain user inputs, especially those involving authorization of financial transactions or disclosure of private information (e.g., passwords, identity documents, and so on), a risk of intercepted, blocked, spoofed, or otherwise modified signaling between a physical input mechanism and a main processor may be particularly problematic and undesirable.

SUMMARY

Embodiments described herein generally relate to electronic devices, and particularly electronic devices having an input mechanism that may be used to receive user inputs, process the received user input securely, deliver a signal to a central processor indicating that a verified user input has occurred (e.g., an interrupt signal), generate a haptic output in response to the user input, and perform a function by the main processor in response to the user input.

One embodiment takes the form of a user equipment or portable electronic device, including a button configured to receive input from a user, analog front-end (AFE) circuitry coupled with the button, an analog-to-digital converter (ADC), a memory, a number of processors (and/or processor cores or other circuitry configured to perform one or more logical or arithmetic operations on digital data), and, optionally, an output circuitry configured to provide a haptic output to the user according to, and/or in response to, the received user input.

The number of processors of the button includes an immutable logic core and a mutable logic core, which may respectively define a secure processing domain and an insecure processing domain. The mutable logic core (also referred to as a master control unit) can include a configurable memory into which operational parameters of the button can be stored, such as one or more force input thresholds defining one or more make and break points of the button. In other cases, the mutable logic core can store one or more operational parameters defining a haptic output that can be provided by the haptic output circuitry (also referred to as a haptic output element).

In these constructions, the AFE circuitry is configured to amplify a signal corresponding to the received force input, and the ADC is configured to convert the amplified force input to a digital input signal provided as input to both the immutable logic core and the mutable logic core. The mutable logic core can process the digital force input to determine whether a user input has been provided, and in response, can signal the immutable logic core to verify that an actual force was received. Only after verification by the immutable logic core can a central processing unit (or input processing system) of an electronic device/user equipment incorporating the button be signaled by the immutable logic core that a (verified) user input event has been received. As a result of this construction, even if the mutable logic core is compromised by malicious software, only genuine user input events will be processed.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments and as defined by the appended claims.

The use of the same or similar reference numerals in different figures indicates similar, related, or identical items.

Figure 1:
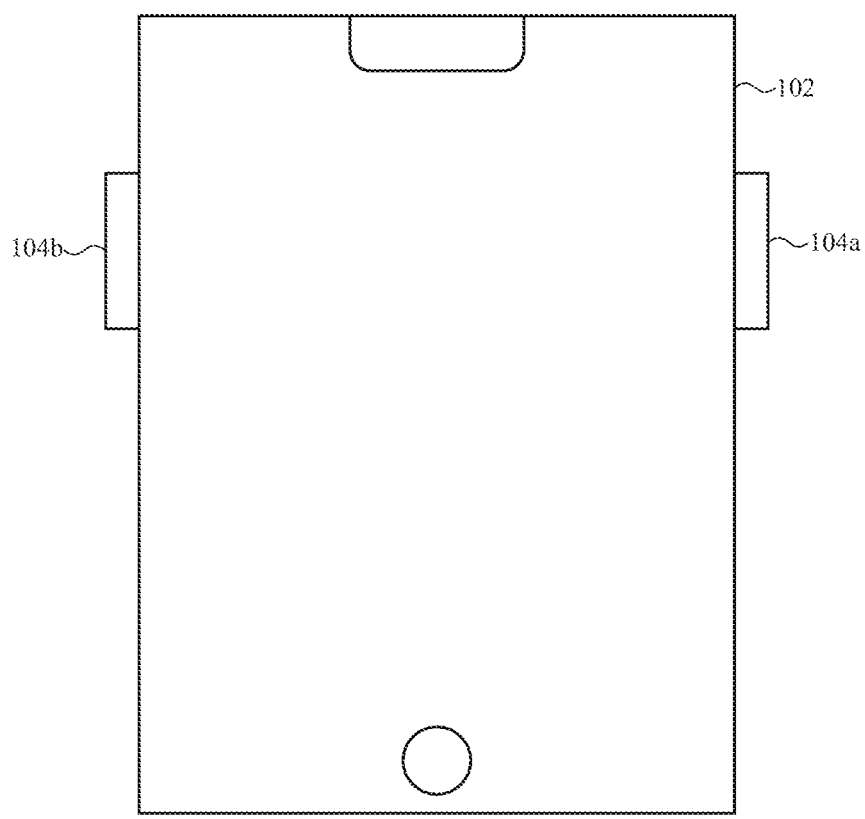
FIG. 1 depicts an example user equipment, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to an electronic device with an input mechanism that is configured to receive user input from a user, as well as to communicate a haptic output to the user. Signals generated by the input mechanism, received by an input processor or central processing unit of the electronic device, are first verified by an immutable logic core of the input mechanism such that, in an event that the electronic device executes malicious software, only genuine, user-originating, input is processed. In response to a (validated/verified) input as described herein, the electronic device may be configured to perform a particular function, which may vary from embodiment to embodiment.

For example, an electronic device may be a smartphone and may include a button to receive a user input. By way of a non-limiting example, the button may be provided on a side edge of a housing of the smartphone, and the user may provide input by applying force at the button.

The user input, applied as a force, may be detected by a force sensor or force-sensitive structure disposed within the button and configured to generate or modify an electrical signal in response to, and/or in proportion to, the force input. An analog domain output from the force sensor (or force-sensitive structure) may be optionally amplified by an analog front-end (AFE) circuitry prior to further processing. The amplified analog-domain signal may be converted into a digital signal using, for example, an analog-to-digital converter (ADC). The digital signal may then be processed and validated as user-originating by a processor, and an appropriate function may be performed by the electronic device in accordance with, and in response to, the received user input.

In some examples, the processor may include a number of distinct processing units and/or cores, each executing different functions. In many embodiments, the processor includes at least a secure core and an insecure core, also referred to herein as an immutable logic core and a mutable logic core. In certain architectures, the immutable logic core and the mutable logic core can each be configured to receive analog or digital domain input from a force sensor or force sensitive structure as described herein. In response to receiving a signal as input, the mutable logic core may determine whether that signal, received from either or both the AFE or the ADC. constitutes a user input, according to a current configuration of the mutable logic core. For example, the mutable logic core may compare the signal to one or more thresholds defining a user input make or a user input break to determine whether the signal can be classified as a user input.

In many configurations, as noted above, the signal may correspond to an output of a force input; the signal may correspond to a magnitude of force applied as input by a user to an exterior surface of the button. In this example, the mutable logic core may determine whether the magnitude of force input was sufficient enough (according to currently-loaded threshold values) to be considered a user input. In response, the mutable logic core can signal the immutable logic core that, according to the mutable logic core, a user input has occurred.

The immutable logic core can receive input(s) from the AFE or ADC and the mutable logic core to determine whether the user input reported by the mutable logic core is a genuine, user-originating force input. For example, the immutable logic core may be configured to compare a time at which an input was received from the AFE and a time at which an input was received from the mutable logic core. If the two signals are received sufficiently close in time, the immutable logic core may validate the mutable logic core's determination that a user input event has occurred.

In some cases, the immutable logic core may also compare an input from the AFE or ADC against one or more thresholds defining minimum or maximum values of force input required to validate a determination by the mutable logic core that a user input event has occurred.

As described herein, an immutable logic core is a processor or set of processors or processor cores that, once manufactured, cannot be reconfigured in the field. In other words, instructions informing operations of the immutable logic core (which may be stored in a memory thereof, or accessible thereby) are read-only instructions.

Conversely, a mutable logic core as described herein is a processor or set of processors or processor cores that, once manufactured, may be field configurable to execute new or different instructions. For example, in different configurations or different operational modes, the mutable logic core may set different thresholds to define user input events, such as button make or button break. In a more simple and non-limiting phrasing, the mutable logic core may be configured to define a first user input with relatively low force thresholds (e.g., a light press of the button causes the mutable logic core to report a possible user input event to the immutable logic core) and may define a second user input with relatively high force thresholds (e.g., a heavy press of the button causes the mutable logic core to report a possible user input event to the immutable logic core).

Generally and broadly, it may be appreciated that a mutable logic core as described herein can be configured by software to perform in custom and implementation specific ways. Conversely, the immutable logic core as described herein is not configurable in the field specifically so the immutable logic core may be leveraged to validate outputs of the mutable logic core, thereby preventing malicious code execution from being able to simulate, intercept, or otherwise spoof a button press. In a more simple phrasing, embodiments described herein ensure that user input events received and processed by a central processing unit of an electronic device are genuine, user-originating inputs.

In some further embodiments, a haptic output may be generated as feedback communicated to the user in response to a user input. In many cases, feedback characteristics can be configured within a mutable logic core, as described herein. An example haptic feedback mechanism is a reluctance engine including a solenoid and a ferromagnetic plate attracted by the solenoid when the solenoid is driven by a current. Another example haptic feedback mechanism is an electrostatic feedback mechanism. In yet other cases, vibrotactile feedback or piezoelectric feedback may be provided. In some cases, the haptic feedback mechanism may additionally and intentionally generate audio feedback. In other cases, haptic output provided by the haptic feedback mechanism may be synchronized and/or provided with audio output from a separate acoustic device, such as a speaker. In these and related embodiments, more generally and broadly, audio feedback may be combined with an output from any of the electrostatic feedback, vibrotactile feedback, and/or the piezoelectric feedback, and so on.

Independent of a mechanism by which feedback is generated, the mutable logic core may configure output provided through that mechanism. For example, in response to low force input, a gentle haptic feedback may be provided. In response to a high force input, a forceful haptic feedback may be provided. In other cases, the mutable logic core may be configured to define multiple stops of force input, and multiple degrees of haptic feedback.

As may be understood by a person of skill in the art, the haptic output may provide the user a confirmation that the user has applied sufficient force to perform a desired function and/or a confirmation that the desired function has been performed or triggered in response to the user input.

In some embodiments, the button may be implemented as a software-defined button. For example, the button may be configured using software instructions to perform a function in accordance with the detection of a position on the button where the user has applied force, a force level, and/or a duration for which the force is applied. For example, when the user applies force at a top portion and a bottom portion of the button, a ringer or other volume level change function may be performed. A central portion of the button may be configured to turn the electronic device on or off when force is applied at the central portion of the button for a specific duration.

In some examples, a particular function to be performed may be associated with an amount of the received force input. If the button is pressed lightly, a screen capture function may be performed, and otherwise, a camera control function or a payment using an application may be performed in response to the received force input at the button.

In some cases, a combination of duration and amount of force input may be used to interpret the user input to perform a device software and/or firmware update for various purposes, including but not limited to malware removal and so on.

Accordingly, what actions to be performed may be based on a position on the button at which a force is applied, an amount of applied force, and/or a duration for which the force is applied at the button by the user. The software-defined button may also simulate a mechanical button by including an elastomeric or other compressible mechanism. In some cases, the software defined button may be mechanically bistable or multi-stable. Many configurations are possible.

In some embodiments, by way of a non-limiting example, the button may be disposed in a housing and mechanically coupled with a force sensor or force sensitive structure. The force sensor may generate or modify an electrical signal corresponding to a force applied by the user to the button. An example force sensor may be a strain gauge sensor that may be used to modify an input electrical signal by an amount corresponding to a change in electrical resistance through the strain garage sensor caused by strain in the sensor resulting from the user-applied force.

In some embodiments, an inductive force sensor or capacitive force sensor may be used, which may change an inductance or a capacitance value corresponding to a change in distance due to the user applied force at the button. For example, an inductive force sensor may include a conductive target contact and one or more inductive sensing coils.

A movement of the conductive target contact due to the force applied at the button may change the inductance value of the one or more inductive sensing coils, which may be used to measure the force input. Similarly, a capacitive force sensor including at least two electrodes separated by a compressible gap may be used. The capacitance of the capacitive force sensor may change in accordance with the user applied force input due to a change in the compressible gap between the at least two electrodes.

In some embodiments, an AFE circuitry may be used to generate an electrical signal corresponding to a user-applied force. The AFE circuitry may include a reference electrical voltage supply and one or more strain gauge bridges to modify an output electrical voltage corresponding to a change in a resistance value based on a force applied by a user at the button.

By way of a non-limiting example, the strain gauge bridge may be a Wheatstone bridge. The output electrical voltage corresponding to the received force input at the button then may be amplified and converted into a digital signal using an ADC converter. In this manner, a digital signal may be generated that corresponds with an analog electrical signal generated in response to and based on a force applied by a user at the button.

As mentioned above, a digital signal corresponding to a user-applied force may be provided as an input to a processor for further digital-domain processing. In some embodiments, by way of a non-limiting example, the processor may be a microcontroller, a microprocessor, a central processing unit, an application-specific integrated circuit, an integrated circuit, a field-programmable gate array, a digital signal processor, and/or a system-on-chip (SoC), and so on. The processor may execute a function according to the received digital input signal.

In some embodiments, the processor may include a number of processor units, such as a main processor unit, an immutable logic core, and a master control unit, each coupled with the other. By way of a non-limiting example, the main processor unit, the immutable logic core, and the master control unit may be coupled with each other via one or more buses and/or one or more relay-boxes. Particularly, the immutable logic core may be coupled with the master control unit over a relay-box. The relay-box may be configured to prevent and/or allow communication between the immutable logic core and the master control unit as needed. The relay-box constrains the data format and memory space access between the immutable logic core and the mutable logic core, which may help to reduce the potential attack surface of a malware that can be injected into the mutable logic core.

As noted above, in some embodiments, the immutable logic core may include instructions that cannot be modified after the immutable logic core is programmed. In other words, no new instructions may be added to or deleted from the instruction set stored in the immutable logic core. Similarly, no instruction of the instruction set stored in the immutable logic core may be modified.

Because no instruction stored in the immutable logic core is modifiable after the immutable logic core is programmed, at least the instructions stored in the immutable logic core section cannot be compromised for any reason, including a malware and so on. The immutable logic core may block the addition, modification, and/or removal of a software instruction based on either a hardware and/or software setting of the immutable logic core. For example, the instruction set of the functions performed by the immutable logic core may be stored in read-only memory. In other words, the instruction set for one or more functions requiring a higher level of security may be stored in the immutable logic core.

These and other constructions described herein dramatically improve end user device security and privacy. For example, as noted above, an electronic device may solicit user conformation (via pressing a physical button), in order to authorize a financial transaction or to authorize disclosure of confidential information, such as a password, real name, address, phone number, photo, biometric information, or other Personally Identifying Information.

As known in the art, even the most diligently developed software may be victim to attack via malicious code. In such cases, due to malicious code, an electronic device may not perform as configured or intended. For example, malicious code may prevent (or unintentionally trigger) execution of a function when a user presses a button of an electronic device, for example, preventing the user from powering off the electronic device or otherwise clearing the malicious code from memory. Malicious code may determine that an application for executing a financial transaction is installed on the device and may generate a command to simulate a physical button press required for authorizing a payment without the user's permission.

In many cases, due in part to sandboxing, malicious code may only be able to run in volatile memory. As a result, it may be recommended to a user to restart or power cycle an electronic device in order to eliminate the malicious code. The security provided by embodiments as described herein can ensure that regardless of sophistication, malicious code cannot prevent the user from using a physical button to power down an electronic device.

In other cases, malicious code may be stored in a durable memory that survives power cycles. In such cases, a malware removal function may be recommended to a user that may require the user to reinstall factory software on the electronic device to clear the malicious code. The security provided by embodiments as described herein can ensure that regardless of sophistication, malicious code cannot prevent the user from using a physical button to execute malware removal operations or tasks.

In some embodiments, the immutable logic core may be configured to determine that the user-applied force meets certain conditions including a force level and duration of force-input, and so on. The user-applied force that meets the certain conditions may be considered as a signal from the user to restore an instruction set in one or more software modules using a default or a specific version of a software release. The specific version of a software release may be a default factory-installed version of the software or a current version of the software available on a cloud-based server. Accordingly, the immutable logic core may send a command that initiates the malware removal function removing the malicious code from the one or more software modules.

In the above examples, it is assumed that the one or more software modules that became compromised are one or more software modules in the master control unit and/or the main processor unit. Because the instructions stored in the immutable logic core cannot be modified, added, and/or deleted after the immutable logic core is programmed, the immutable logic core cannot be compromised. Accordingly, in some embodiments, the immutable logic core may be configured to initiate the malware removal function, in response to the user input, removing the malicious code from the one or more software modules of the main processor unit and/or the master control unit. The malware removal function as described in this disclosure may bypass both the main processor unit and the master control unit.

In some embodiments, the instruction set stored in the immutable logic core may prevent a command received from the master control unit that is related to a financial transaction function. The immutable logic core, upon receiving the command corresponding to the financial transaction function, may determine if the received command is in response to the user input. The immutable logic core may determine that the user has not authorized such financial transaction based on an absence of a signal input from the AFE circuitry and/or ADC. Accordingly, the immutable logic core may suppress execution of the financial transaction function.

In some embodiments, the immutable logic core may include an instruction set corresponding to a force processing algorithm and/or a button click processing algorithm. By way of a non-limiting example, the force processing algorithm may be related to a power cycling function (e.g., hold to power down), and so on, and the button click processing algorithm may be related to the financial transaction function and the like.

In some embodiments, the immutable logic core may also include haptic feedback control to communicate to the user a haptic output to solicit from the user an appropriate amount of force input at the button. The haptic output element to provide the haptic output is discussed in detail below.

In some embodiments, upon determining that the function to be executed is not one of the functions requiring a higher level of security, the immutable logic core may send a command to the master control unit, for example, using a relay-box. The master control unit may include an instruction set for performing functions, such as processing of user inputs at buttons for volume up/down, ringer volume up/down. The functions performed by the master control unit may also include firmware download, position data processing, debugging, and so on.

Accordingly, a master control unit may execute a function interpreting force data and generate haptic output as described above. The master control unit may also be coupled with a read-only memory and/or a static random-access memory, which may store further instruction sets as used by the master control unit.

In some embodiments, the haptic output element or the haptic output voltage generator may generate haptic output to communicate feedback to the user in response to the user input, such as a force applied at the button. In some cases, the haptic output may be provided with an audio feedback, an electrostatic feedback, a vibrotactile feedback, a piezoelectric feedback, and/or a combination thereof.

If the user gently presses the button and if the haptic output is generated without taking into consideration the force applied by the user, then the haptic feedback may be stronger in comparison to the user input. Accordingly, the user may apply less force, thinking the applied force is excessive. Similarly, if the user applies excessive force, and the haptic feedback generated is not as strong as the force applied by the user, the user may tend to apply even more force.

Accordingly, in some embodiments, the haptic output element may be configured to generate haptic feedback to solicit an appropriate amount of force input from the user. By way of a non-limiting example, the haptic output element may be configured to generate a less strong haptic feedback signal to produce a less strong haptic feedback when the user has applied a light force at the button. Similarly, the haptic output element may be configured to generate a stronger haptic feedback signal to produce a stronger haptic feedback when the user has applied a strong force at the button.

In some embodiments, based on the inductance value, a desired amount of haptic feedback, for example, a displacement of a portion of an electronic device, may be determined, as described herein, in accordance with some embodiments. Further, an amount of target force to cause the determined displacement of the portion of the electronic device and a corresponding electrical signal may be determined. The generated electrical signal may be applied to an actuator of the haptic output element to generate the haptic feedback that is adaptive to the user input.

In some embodiments, the user equipment may also include at least two different power supply rails. By way of a non-limiting example, a first power supply rail may provide power supply only to a first subset of components of the user equipment, when an electrical voltage level of the first supply voltage rail is above a first predetermined voltage level. The first power supply rail may provide a power supply only when the user equipment is in shelf mode, e.g., in a power off mode. The first subset of components of the user equipment may include the immutable logic core. As a result of this construction, a software-defined button may still be used to power on an electronic device even if the device appears to a user to be in shelf mode.

The immutable logic core may scan for the force input received at the button at a low frequency while the user equipment is in shelf mode. Upon detecting that the user has applied force at the button to turn the user equipment on, the frequency of detecting the force input at the button may be increased. In addition, a second power supply rail may then provide the required power to a second subset of components of the user equipment. The second subset of components may include the first subset of components. When the second power supply rail is used to power the second subset of components, the first subset of components may be stopped from being powered by the first power supply rail. Accordingly, the user equipment may have a longer shelf-life.

These foregoing and other embodiments are discussed below with reference to FIGS. 1-8. However, those skilled in the art will readily appreciate that the detailed description given herein with respect to these figures is for explanation only and should not be construed as limiting.

FIG. 1 depicts an example user equipment, such as described herein, in accordance with some embodiments. A portable electronic device 102 is shown in FIG. 1, having two buttons 104a and 104b. A user may provide user input by applying force at a button, for example, 104a or 104b, to invoke various functions performed by the portable electronic device 102. Different functions may be invoked when the user provides input as a force at each of the buttons 104a and/or 104b.

By way of a non-limiting example, the functions being performed as a result of user input may be volume up/down, power cycle the portable electronic device 102 (e.g., turning the portable electronic device 102 on/off), and so on. In some embodiments, in response to the user input in the form of the force applied at the button 104a or 104b, haptic feedback may be communicated to the user. The haptic feedback may be communicated to the user as an acknowledgment of the user input and/or as a confirmation that an action is performed in response to the user input.

In some embodiments, there may be more or less than two buttons on the portable electronic device 102. Though a button 104a and a button 104b are shown in FIG. 1 on side edges of the portable electronic device 102, the buttons 104a and 104b may be positioned at any region of the portable electronic device 102.

In some embodiments, by way of a non-limiting example, the portable electronic device 102 may be a wearable electronic device, a laptop, a tablet, a desktop, an electronic device configured to receive user input in any form, and so on. The wearable electronic device may be a mobile phone, a smartphone, an electronic watch, or a smartwatch, and so on.

Accordingly, depending on the type of the user equipment, the portable electronic device 102 may include a housing, a display, a physical and/or a touchscreen keyboard, a speaker, and/or a microphone, and so on. The housing, the display, and/or any component of the portable electronic device 102 may be flexible and/or bendable. The portable electronic device 102 may be made of glass, metal, plastic, and/or any combination thereof, for example.

These foregoing embodiments depicted in FIG. 1 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
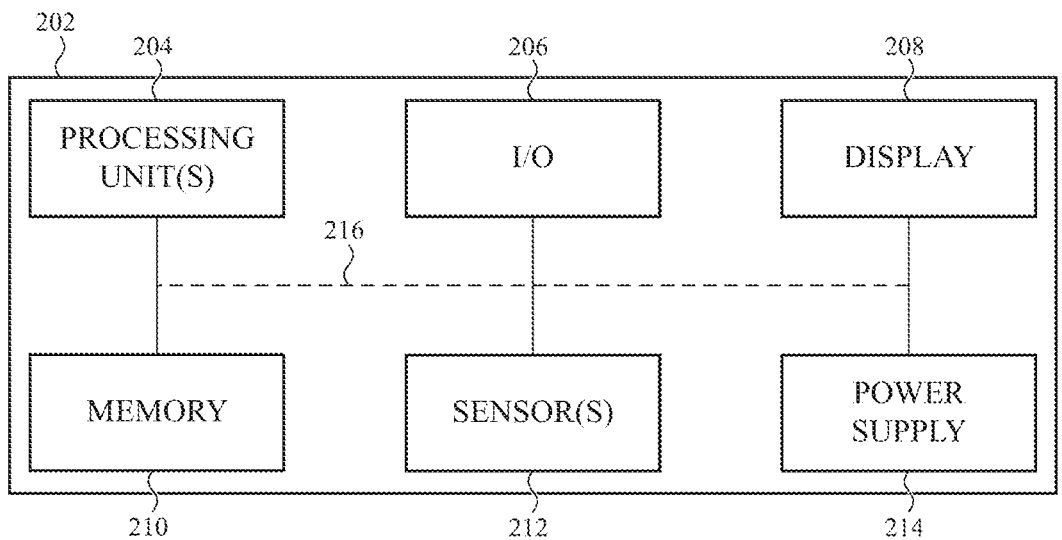
FIG. 2 depicts an example electrical block diagram of the user equipment of FIG. 1, such as described herein.

FIG. 2 depicts an example electrical block diagram of the user equipment of FIG. 1, such as described herein, in accordance with some embodiments. The user equipment 202, which may be similar to the portable electronic device 102 shown in FIG. 1, may include one or more processing units 204, an input/output mechanism 206 (e.g., an input/output device, input/output port, or a button 104a or 104b, a haptic output interface, or the combination thereof), a display 208 (e.g., a light-emitting display), a memory 210 or a storage device, one or more sensors 212, and a power supply 214.

The one or more processing units 204 can communicate, either directly or indirectly, with some or all of the components of the user equipment 202. For example, a system bus 216 or other communication mechanisms can provide communication between the one or more processing units 204, the power supply 214, the memory 210, the one or more sensors 212, and the input/output mechanism 206, and the display 208.

The one or more processing units 204 may be implemented as any electronic device capable of processing, receiving, or transmitting data or instructions. By way of a non-limiting example, the one or more processing units 204 may be a microcontroller, a microprocessor, a central processing unit, an application-specific integrated circuit, an integrated circuit, a field-programmable gate array, a digital signal processor, and/or a system-on-chip (SoC), and so on. Accordingly, the term "processing unit" and similar terms and phrases is meant to encompass a single processor or processing unit, multiple processors, multiple processing units, or other suitably configured computing element or elements.

In some embodiments, various components of the user equipment 202 may be controlled by multiple processing units. For example, select components of the user equipment 202 (e.g., a sensor 212) may be controlled by a first processing unit, and other components of the user equipment 202 (e.g., the display 208) may be controlled by a second processing unit, where the first and second processing units may or may not be in communication with each other.

By way of a non-limiting example, in some embodiments, an input may be processed through a number of processing units. Each processing unit of the number of processing units may process the received input according to the instruction set corresponding to that processing unit and then may forward or send a command to other processing units for further processing.

In some embodiments, the power supply 214 may be implemented with any device capable of providing energy to the user equipment 202. For example, the power supply 214 may be one or more batteries or rechargeable batteries. By way of a non-limiting example, the power supply 214 may be a power connector or power cord that connects the user equipment 202 to another power source, such as a wall outlet. In some embodiments, by way of a non-limiting example, the power supply 214 may be implemented as a USB-powered power supply.

In some embodiments, the memory 210 may store electronic data that may be used by the user equipment 202. For example, the memory 210 may store electrical data or content such as, for example, software instructions, algorithms, audio and video files, documents and applications, device settings and user preferences, timing signals, control signals, and data structures or databases. The memory 210 may be configured as any type of memory. By way of a non-limiting example, the memory 210 may be implemented as random access memory, read-only memory, static random-access memory, Flash memory, removable memory, and/or a hard disk, and so on In some embodiments, the user equipment 202 may include one or more sensors 212 positioned almost anywhere on the user equipment 202. The one or more sensors 212 may be configured to sense one or more types of parameters, which by way of a non-limiting example may include pressure, light, touch, heat, movement, relative motion, and/or biometric data (e.g., biological parameters), and so on.

By way of a non-limiting example, in some embodiments, the one or more sensors 212 may include a force sensor, a heat sensor, a position sensor, a light or optical sensor, an accelerometer, a pressure transducer, a gyroscope, a magnetometer, a health monitoring sensor, and so on. In some embodiments, the force sensor may be implemented as a strain gauge. Additionally, the one or more sensors 212 may utilize any suitable sensing technology, including, but not limited to, capacitive, ultrasonic, resistive, optical, ultrasound, piezoelectric, and thermal sensing technology.

In some embodiments, the I/O mechanism 206 may transmit and/or receive data from a user or another electronic device. An I/O device may include a display, a touch sensing input surface, one or more buttons (e.g., a graphical user interface "home" button, a physical button such as a tact switch button), one or more cameras, one or more microphones or speakers, one or more ports such as a microphone port, and/or a keyboard. In some embodiments, by way of a non-limiting example, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections. An I/O device can also be a software-defined electromechanical button including a sensor to sense user input force, a haptic engine to generate tactile feedback to the user, and a digital circuit to generate button signals for other sub-blocks in the user equipment 202 according to some embodiments, as described herein.

These foregoing embodiments depicted in FIG. 2 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
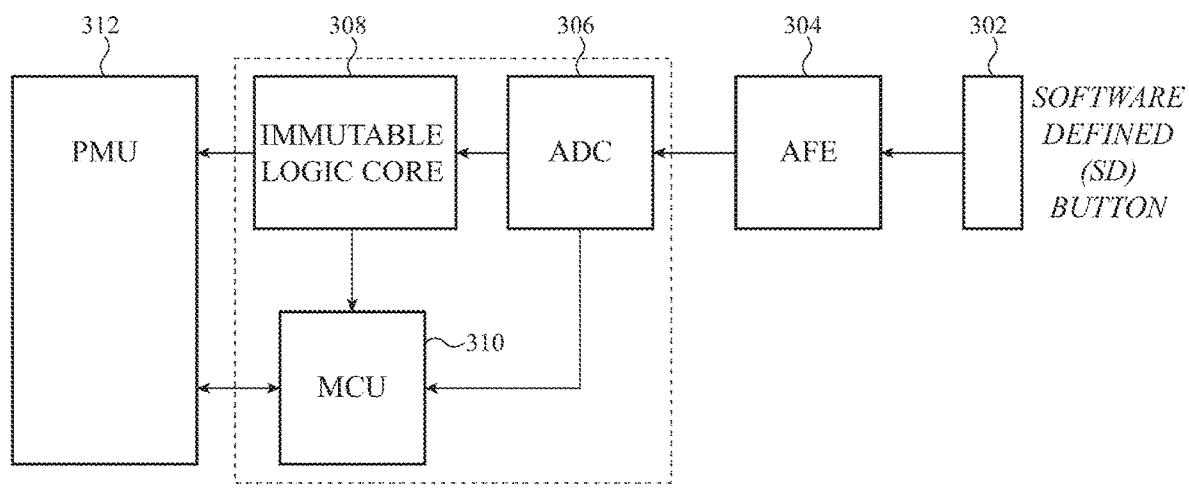
FIG. 3 depicts an example system block diagram of user input processing blocks, such as described herein.

FIG. 3 depicts an example system block diagram of user input processing blocks, such as described herein, in accordance with some embodiments. A button 302, which may be a software-defined button, as described below, may be coupled with an AFE circuitry 304. The AFE circuitry 304 may generate an electrical signal corresponding to a user input received at the software-defined button 302. For example, the electrical signal generated by the AFE circuitry 304 may be an electrical voltage signal.

The AFE circuitry 304 may be coupled with an analog-to-digital converter (ADC) 306. Accordingly, the electrical voltage signal generated by the AFE 304 may be converted into a digital signal by the ADC 306. The digital signal generated by the ADC 306 may be provided as an input to an immutable logic core 308 and a master control unit 310.

In some cases, the AFE circuitry 304 and the ADC 306 may be configured to interface with a sensor that measures button motion, a voltmeter that measures load voltage, a current sensor that measures load current, or some combination of them.

The immutable logic core 308 and the master control unit 310 each may be configured to process the received digital input from the ADC 306 in accordance with an instruction set and/or algorithms stored in a memory, for example, 210. The immutable logic core 308 and the master control unit 310 may be coupled with each other, for example, via a relay-box configured to prevent and/or allow communication between the immutable logic core 308 and the master control unit 310. Accordingly, the connection path between the immutable logic core 308 and the master control unit 310 may be controlled, as needed, as described in detail below.

After processing the digital input from the ADC 306 at the immutable logic core 308 and/or the master control unit 310, the immutable logic core 308 and/or the master control unit 310 may generate an output signal for further processing by a main processing unit. The immutable logic core 308 and the master control unit 310 may be coupled with the main processing unit, for example, via a system bus.

In some embodiments, by way of a non-limiting example, the button 302 may be configured to perform various functions such as camera control, financial transaction, power cycle the portable electronic device 102 or 202, and so on, in response to a user input. The function to be performed may be based on a position on the button at which the force is applied, an amount of applied force, and/or a duration for which the force is applied at the button by the user.

Because the button 302 may be configured to perform various functions using software instructions, the button 302 is a software-defined button. For example, a top portion and a bottom portion of the button 302 may be configured to change a ringer or other volume levels in response to user applied force input at the top portion or the bottom portion of the button 302. In response to receiving force input at a central portion of the button 302 for a specific duration, the electronic device may be power cycled (e.g., the electronic device may be turned on or off).

In some examples, a particular function to be performed may be associated with an amount of the received force input at the button 302. If the button 302 is pressed lightly, a screen capture function may be performed, and otherwise, a camera control function or a financial transaction, may be performed in response to the received force input at the button 302.

In some cases, a combination of duration and amount of force input may be used to interpret the user input to perform a device software and/or firmware update for various purposes, including but not limited to malware removal and so on.

Accordingly, what actions to be performed may be based on a position on the button 302 at which a force is applied, an amount of applied force, and/or a duration for which the force is applied at the button 302 by the user. Accordingly, the button 302 may act as a software-defined button. The software-defined button 302 may also simulate a mechanical button.

The software-defined button 302 may be disposed in a housing of the portable electronic device 102 or 202 and coupled with a force sensor (not shown). The force sensor may generate or modify an electrical signal corresponding to a force applied by the user to the button. An example force sensor may be a strain gauge sensor that may be used to modify an input electrical signal by an amount corresponding to a change in electrical resistance through the strain garage sensor caused by strain in the sensor resulting from the user-applied force.

In some embodiments, an inductive force sensor or capacitive force sensor may be used, which may change an inductance or a capacitance value corresponding to a change in distance due to the user applied force at the button. For example, an inductive force sensor may include a conductive target contact and one or more inductive sensing coils. When the user applies force at the button, conductive target contact may move to cause a change in an inductance value of the one or more inductive sensing coils. The change in the inductance value of the one or more inductive sensing coils may be used to measure the force input.

In many cases, force measurement in this manner can be performed by a haptic output element, such as the haptic output element configured to leverage magnetic reluctance to generate haptic feedback. More specifically, in a haptic output mode, the magnetic reluctance engine can apply a current to a coil which generates, in response, a magnetic field that attracts a ferromagnetic plate in proximity thereof. In a force input mode, the coil may be used as an inductor in a resonating electrical circuit; as the position of the ferromagnetic plate changes as a result of force input, inductance of the coil may change in a measurable manner. In yet other examples, inductance and/or input impedance exhibited by a haptic output element can be analyzed to characterize haptic output(s) provided by that element. In some cases, this construction can ensure that haptic output provided by the haptic output element is perceived by a user to be consistent regardless of input force.

In other examples, other force sensors can be used. For example, by way of a non-limiting example, a capacitive force sensor including at least two electrodes separated by a compressible gap may be used. The capacitance of the capacitive force sensor may change in accordance with the user applied force input due to a change in the compressible gap between the at least two electrodes. The change in the capacitance value may be used to determine the input force value.

In some embodiments, as mentioned above, the AFE circuitry 304 may be used to generate an electrical signal corresponding to a user-applied force. The AFE circuitry 304 may include a reference electrical voltage supply (not shown) or an electrical current source (not shown) and one or more strain gauge bridges (not shown) to modify an output electrical voltage or current corresponding to a change in a resistance value based on a force applied by a user at the button 302.

By way of a non-limiting example, the strain gauge bridge may be a Wheatstone bridge. The output electrical voltage corresponding to the received force input at the button then may be amplified and converted into a digital signal using the ADC 306. Accordingly, a digital signal may be generated that corresponds with an analog electrical signal generated in response to and based on a force applied by a user at the button 302. The ADC 306 is not described in detail in this disclosure. In these examples, strain gauges can be measured as individual resistors, as voltage dividers, or as a full bridge. Multiple measurements can be taken, and optionally compared against reference resistors (e.g., via differential measurement techniques) to ensure accurate and precise strain measurements that can be correlated to force applied.

In some embodiments, a digital signal corresponding to a user-applied force from the ADC 306 may be provided as an input signal to both the immutable logic core 308 and the master control unit 310 for further digital-domain processing. The digital signal from the ADC 306 may be first processed by the immutable logic core 308. As mentioned above, the immutable logic core may include instructions that cannot be modified after the immutable logic core is programmed. In other words, no new instructions may be added to or deleted from the instruction set stored in a memory section used by the immutable logic core.

Similarly, no instruction stored in the instruction set stored in the memory section used by the immutable logic core may be modified. Because no instruction stored in the immutable logic core 308 is modifiable after the immutable logic core is programmed, at least the instructions stored in the immutable logic core 308 cannot be compromised for any reason, including malware and so on. The immutable logic core 308 may block the addition, modification, and/or removal of a software instruction based on either a hardware and/or software setting of the immutable logic core. For example, the software instructions related to functions performed by the immutable logic core 308 may be stored in a read-only memory.

The portable electronic device 102 or 202 may become a victim of malicious codes. In such cases, due to malicious codes, the portable electronic device 102 or 202 may not perform as configured or intended. For example, a malicious code may prevent execution of a function when the user presses the button 302, for example, preventing the user from powering off the electronic device or otherwise clearing the malicious code from memory. The malicious code may identify an application on the portable electronic device 102 or 202 to perform a financial transaction and may generate a command to perform the financial transaction without the user's permission.

More generally and broadly, it may be appreciated that some functions, such as a malware removal function, a function performing a financial transaction, power cycling the user equipment (e.g., turning the user equipment on and/or off), and so on, may require a higher level of security in comparison to other functions such as volume up/down, and so on.

In some embodiments, based on the received input signal from the ADC 306, the instruction set stored in the section of the memory 210 for the immutable logic core 308 may determine that the user has applied force that meets certain conditions including a force level and duration of force-input, and so on. The user-applied force that meets the certain conditions may be considered as a signal from the user to restore the instruction set for the portable electronic device 102 or 202 using a default or a specific version of a software release.

In some embodiments, the specific version of a software release may be a default factory-installed version of the software or a current version of the software available on a cloud-based server. Accordingly, the immutable logic core 308 may send a command that initiates the malware removal function removing the malicious code from the portable electronic device 102 or 202.

In some embodiments, the instruction set stored in the section of the memory 210 for the immutable logic core 308 may prevent the execution of a command received from the master control unit 310. By way of a non-limiting example, the command prevented from execution may be related to a financial transaction. The immutable logic core 308, upon receiving the command corresponding to the financial transaction, may determine if the received command from the master control unit 310 is in response to the user input.

The immutable logic core 308 may determine that the user has not authorized such financial transaction based on an absence of a signal indicating user-applied force input from the AFE circuitry 304 and/or the ADC 306. Accordingly, the immutable logic core 308 may suppress the execution of the command related to the financial transaction received from the master control unit 310.

As described herein, the immutable logic core 308 may be configured to process functions that require a higher level of security or makes the portable electronic device 102 or 202 a more secure device. The immutable logic core 308 then may send a command to perform the function to the main processing unit. Thus, the immutable logic core 308 may act as a security module of the portable electronic device 102 or 202.

In some embodiments, the master control unit 310 may process a digital input signal from the ADC 306 and/or a command from the immutable logic core 308. The digital input signal from the ADC 306 or the command from the immutable logic core 308 may be related to a function that does not require a higher level of security. By way of a non-limiting example, such function being performed by the master control unit 310 may include a volume up/down function, a function related to the processing of position data, and/or certain configuration parameter settings, and/or functions based on a force input or a button click that does not require a higher security, and so on. The master controller unit may also control haptic feedback generation and may be connected to a class D amplifier (not shown) and/or a boost circuit (not shown) to generate the haptic feedback.

The class D amplifier and the boost circuit are not discussed in detail in this disclosure for brevity.

In some embodiments, the main processing unit may control the functionality of the portable electronic device 102 or 202. By way of a non-limiting example, the main processing unit may execute functions after a digital signal from the ADC 306 is preprocessed by the immutable logic core 308 and/or the master control unit 310.

In some embodiments, the immutable logic core 308 and the master control unit 310 may be coupled with a power management unit 312. The power management unit may supply electrical voltage to power the immutable logic core 308 and the master control unit 310 along with other components of the portable electronic device 102 or 202. The power management unit 312 is described in detail below with reference to FIG. 4.

These foregoing embodiments depicted in FIG. 3 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
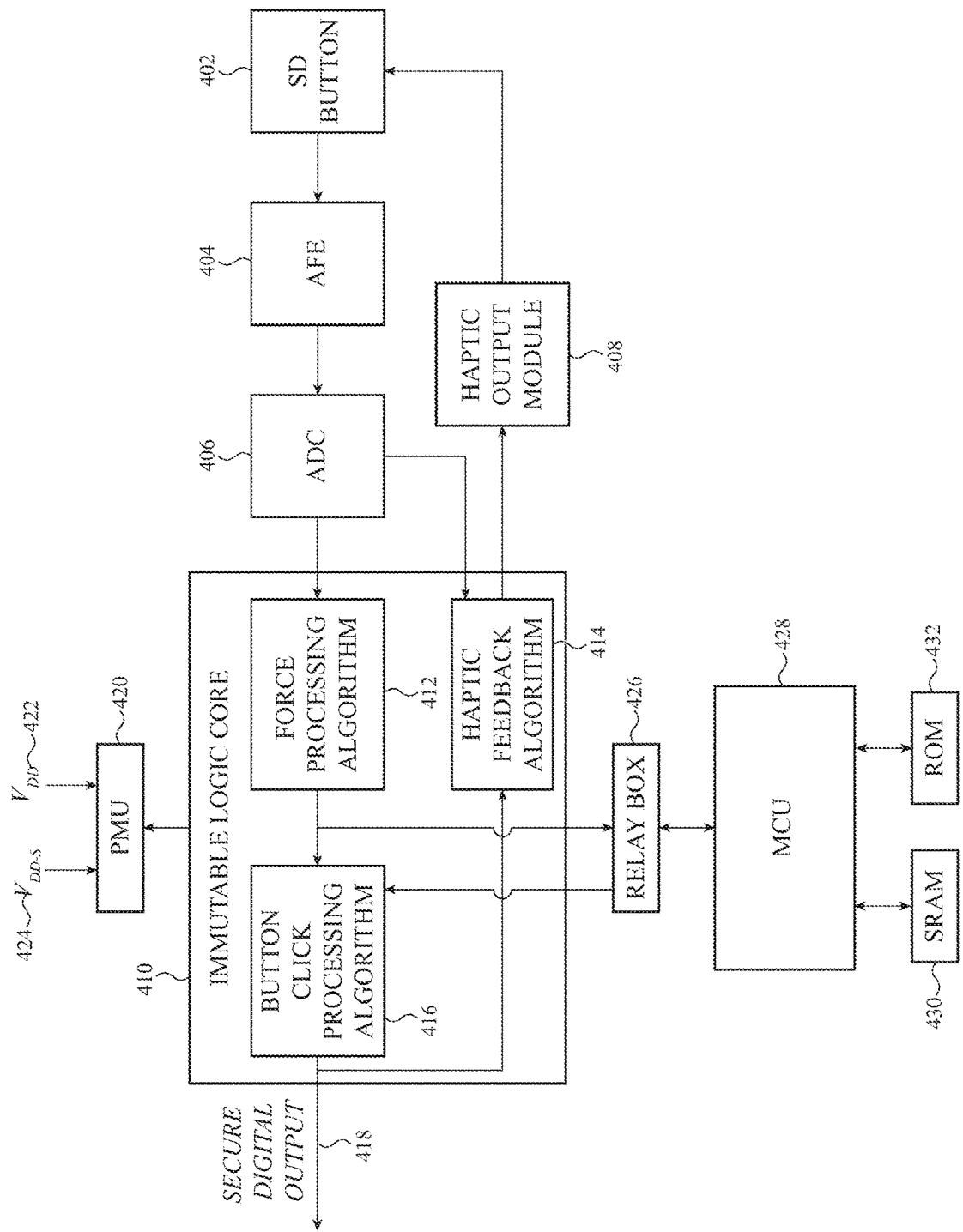
FIG. 4 depicts a detailed view of some of the user input processing bocks, such as described herein.

FIG. 4 depicts a detailed view of some of the user input processing bocks, such as described herein, in accordance with some embodiments. A software-defined button 402 shown in FIG. 4 may be similar to the button 302. The software-defined button 402 is coupled with an AFE circuit 404, which may be similar to the AFE circuitry 304 described above with reference to FIG. 3. The AFE 404 may be coupled with an ADC 406, which may be similar to the ADC 306. Accordingly, the software-defined button 402, the AFE circuitry 404, and the ADC 406 are not described again in detail with reference to FIG. 4.

In some embodiments, an immutable logic core 410 may be similar to the immutable logic core 310 that is discussed above with reference to FIG. 3. Accordingly, the immutable logic core 410 may be configured to perform the same functions as the immutable logic core 310. The immutable logic core 410 shown in FIG. 4 may include a force processing algorithm 412 and a button click processing algorithm 416 that is configured to provide a secure output 418 to downstream interrupt processors, input systems, or a central processing unit. The immutable logic core 410 may also include a haptic feedback algorithm 414 to communicate to the user haptic feedback that is adaptive to the user input.

In some embodiments, by way of a non-limiting example, the immutable logic core 410 may also include a haptic feedback algorithm 414 to ensure that a haptic feedback is provided to the user when input force on software defined button 402 exceeds a certain value in order to prevent any malware on mutable logic core 428 from silencing haptic feedback for the purpose of tricking the user into unintentionally pressing the button. In normal conditions, the mutable logic core 428 will play a haptic waveform on to haptic output element 408 via a haptic output generator 606

(to be discussed later) after user input force exceeds a threshold (interpreted either by immutable logic core 410 or mutable logic core 428 depending on the embodiment) and a button event is registered on secure digital output 418. The AFE 304 (404) and the ADC 306 (406) may be parallel instantiations interfacing independently to a sensor that measures button motion, a voltmeter that measures load voltage 610, a current sensor that measures load current, or some combination of them.

For example, when the mutable logic core 428 plays a haptic waveform onto haptic output element 408 via haptic output generator 606, a generated voltage signal 610 that can be read on an ADC 406. In some cases, a different ADC and AFE may be used for reading the generated voltage signal 610 and for operating the force sensor. If the immutable logic core 410's haptic feedback algorithm 414 does not see an expected signal within a certain time window, the mutable logic core 410 may override the haptic output generator 606 and force the haptic output generator to output a predetermined haptic waveform to haptic output element 408. The predetermined haptic waveform may be stored inside the immutable logic core 410. This haptic waveform maybe of a different quality or characteristic than what an uncompromised mutable logic core 428 may have played. In some cases, the haptic waveform may generate or be provided with an audio feedback (e.g., provided from a speaker, a piezoelectric element, or other similar device), an electrostatic feedback, a vibrotactile feedback, an ultrasonic or other piezoelectric feedback, and/or a combination thereof.

The force processing algorithm 412 may be configured to determine the amount of force applied by the user to the software-defined button 402. The force processing algorithm may be configured to determine the time duration for which the user has applied force. Based on the amount of force and the time duration, the force processing algorithm 412 may determine the function requested by the user for execution.

For example, when the portable electronic device 102 or 202 is compromised (e.g., due to malicious code), the user may be prevented from using the portable electronic device 102 or 202 in the desired manner. As an example, the user may not power cycle the portable electronic device 102 or 202 as desired due to the malicious code.

However, because the immutable logic core 410 includes its instruction set in a nonvolatile area of the memory 210, the instruction set related to the immutable logic core 410 may not be affected due to the malicious code. As a result, the force processing algorithm 412 may perform the malware removal function when the amount of force applied by the user and/or the time duration for which the force is applied satisfies certain conditions, as discussed below with reference to FIG. 5A.

In some embodiments, the button click processing algorithm 416 may be configured to detect that a function, for example, for the execution of a financial transaction, is requested by a master controller unit 428 coupled to the immutable logic core 410 via a relay-box 426. The master controller unit 428 may be similar to the master controller unit 310 described above.

In some embodiments, a user may be required to click the software-defined button 402 to execute a function for the financial transaction. Accordingly, when the immutable logic core 410 receives a command to perform the payment function, which requires processing by the immutable logic core 410 before processing by a main processing unit (not shown), the button click processing algorithm 416 may perform validation of a user input at the software-defined button 402 received via the AFE circuitry 404 and the ADC 406.

If the button click processing algorithm 416 determined that the user has not applied force at the software-defined button 402 to click the button, the button click processing algorithm 416 may block execution of the function related to the financial transaction. While a function related to a financial transaction is used here as an example, any other function, which requires a higher level of security, may be implemented as described herein.

As shown in FIG. 4, the immutable logic core 410 may be coupled with a power management unit (PMU) 420. The PMU 420 may be connected to one or more power supply sources. By way of a non-limiting example, the PMU 420 may be coupled with a power rail $V_{DD}$ 422 and another power rail $V_{DD\_S}$ 424. The power supply rail $V_{DD\_S}$ 424 may power a first subset of components of the portable electronic device 102 or 202 when an electrical voltage level of the power supply rail $V_{DD\_S}$ 424 is above a first voltage level. The power supply rail $V_{DD\_S}$ 424 may provide a power supply only when the portable electronic device 102 or 202 is in shelf mode, e.g., in power off mode.

By way of a non-limiting example, the first subset of components of the portable electronic device 102 or 202 may include the immutable logic core 410, the AFE 404, and/or the ADC 406. The immutable logic core 410 using the force processing algorithm 412 may scan for the received force input at the software-defined button 402 at a low frequency while the user equipment is in shelf mode. Upon detecting that the user has applied force to the software-defined button 402 to turn the portable electronic device 102 or 202 on, the frequency of detecting the force input at the software-defined button 402 may be increased. In addition, the power rail $V_{DD}$ 422 may then provide the required power to a second subset of components of the portable electronic device 102 or 202, when an electrical voltage level of the power rail $V_{DD}$ 422 meets the certain conditions for voltage level. By way of a non-limiting example, the second predetermined voltage level may be different from the first predetermined voltage level, and the second subset of components may include the first subset of components. When the second power supply rail is used to power the second subset of components, the first subset of components may be stopped from being powered by the first power supply rail. Accordingly, shelf-life of the portable electronic device 102 or 202 may be extended.

In some embodiments, a master control unit 428 shown in FIG. 4 may be similar to the master control unit 310, which is described above. Accordingly, the master control unit 428 is not described again. The master control unit 428 may be coupled with a memory 210, for example, an SRAM 430 and a ROM 432.

In some embodiments, the master control unit 428 may determine what type of haptic feedback to generate. For example, upon receiving user input to perform function A, the master control unit 428 may determine that the haptic feedback of a pattern A may be required, and upon receiving user input to perform function B, the master control unit 428 may determine that the haptic feedback of a pattern B may be required. The master control unit 428 may be coupled with a class D amplifier (not shown) and/or boost converter (not shown) to generate the haptic feedback. By way of a non-limiting example, in some embodiments, the class D amplifier and/or the boost amplifier may be included in the haptic output element 408, which is described in detail below using FIG. 6.

These foregoing embodiments depicted in FIG. 4, and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5A:
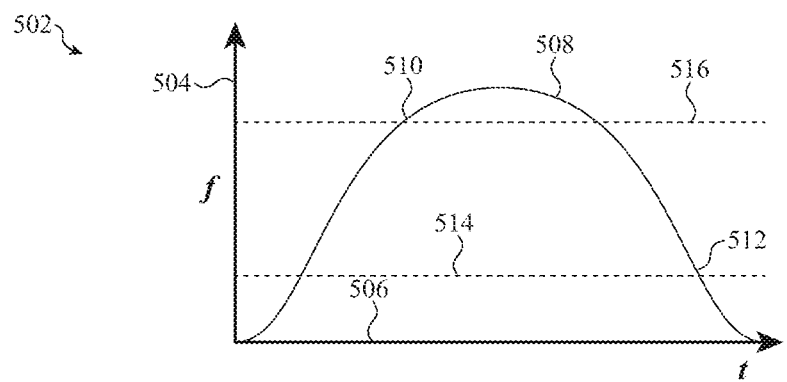
FIG. 5A depicts a graph showing user input as a force over time, such as described herein.

FIG. 5A depicts a graph showing user input as a force over time, such as described herein, in accordance with some embodiments. As shown in FIG. 5A, a graph 502 describes user-applied force to the software-defined button 302 or 402 on Y-axis 504 over time on X-axis 506. User input as force applied at the software-defined button 302 or 402 over time may be represented as shown in FIG. 5A as 508 and may have a first threshold value for the force input as 516 and a second threshold value for the force input as 514. When the user-applied force satisfies 510 the first threshold value 516, the force processing algorithm 412 of the immutable logic core 410 or 308 may determine that the user wants to perform the malware removal function, as described above in accordance with some embodiments.

In some embodiments, when the user-applied force input 512 does not satisfy the second threshold value 514 and/or the first threshold value 516, the master control unit 428 or 310 may generate adaptive haptic output to the user for a refined click experience. In other words, a haptic output of an appropriate strength may be communicated to the user to solicit user input of a correct amount of force.

Figure 5B:
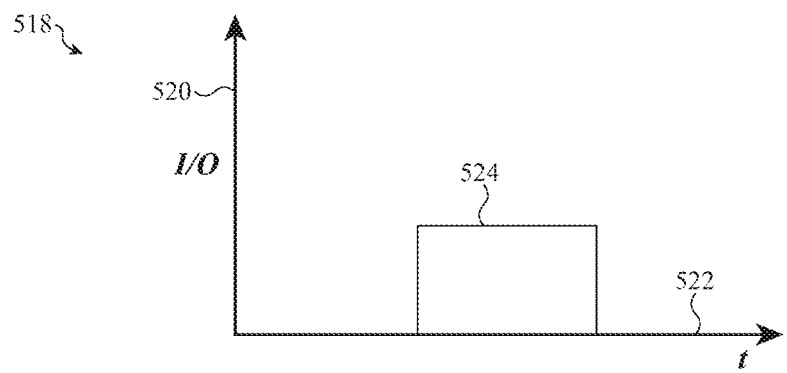
FIG. 5B depicts toggling of a power management unit corresponding to the user input as shown in FIG. 5A, such as described herein.

FIG. 5B depicts toggling of a power management unit corresponding to the user input as shown in FIG. 5A, such as described herein, in accordance with some embodiments. As shown in 5A, by way of a non-limiting example, the user may be required to apply force to the software-defined button 302 or 402 that satisfies a certain force threshold value, for example, the first threshold value 516, at which the immutable logic core 308 or 410 may determine that the user intends to power on the portable electronic device 102 or 202. Accordingly, the immutable logic core 308 or 410 may invoke a power cycle function.

As a result of invoking the power cycle function, the immutable logic core 308 or 410 may cause the toggling of the PMU 420 by powering the components of the portable electronic device 102 or 202 from the power rail $V_{DD}$ 422 and disconnecting from the power rail $V_{DD\_S}$ 424. Accordingly, as shown in FIG. 5B, a graph 518 illustrates an I/O function along Y-axis 520 over time on X-axis 522. At 524, when the user-applied input force satisfies the first threshold value 516, the power cycle function may be invoked, and PMU 420 toggling may be performed.

Figure 5C:
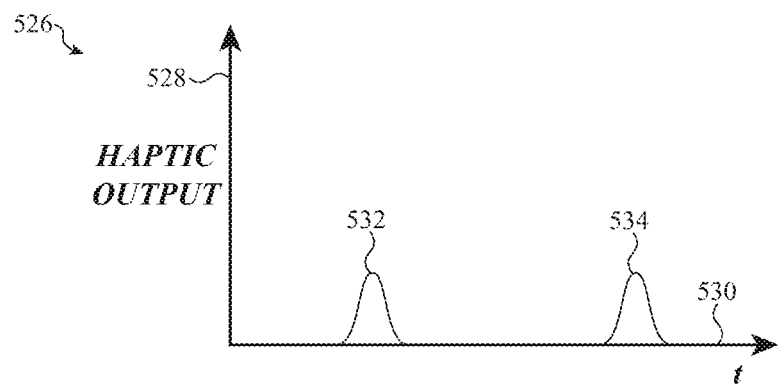
FIG. 5C depicts a haptic output generated over time corresponding to the user input as shown in FIG. 5A, such as described herein.

FIG. 5C depicts a haptic output generated over time corresponding to the user input as shown in FIG. 5A, such as described herein, in accordance with some embodiments. As shown in FIG. 5C, a graph 526 shows a haptic output along Y-axis 528 over time on X-axis 530. When the user-applied force input 512 does not satisfy the second threshold value 514 and/or the first threshold value 516, the master control unit 428 or 310 may enable adaptive haptic output to the user for a refined click experience and generate signals 532 and 534 as shown in FIG. 5C. In other words, the user may be provided haptic feedback of an appropriate strength to solicit user input of a correct amount of force.

These foregoing embodiments depicted in FIGS. 5A-5C, and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
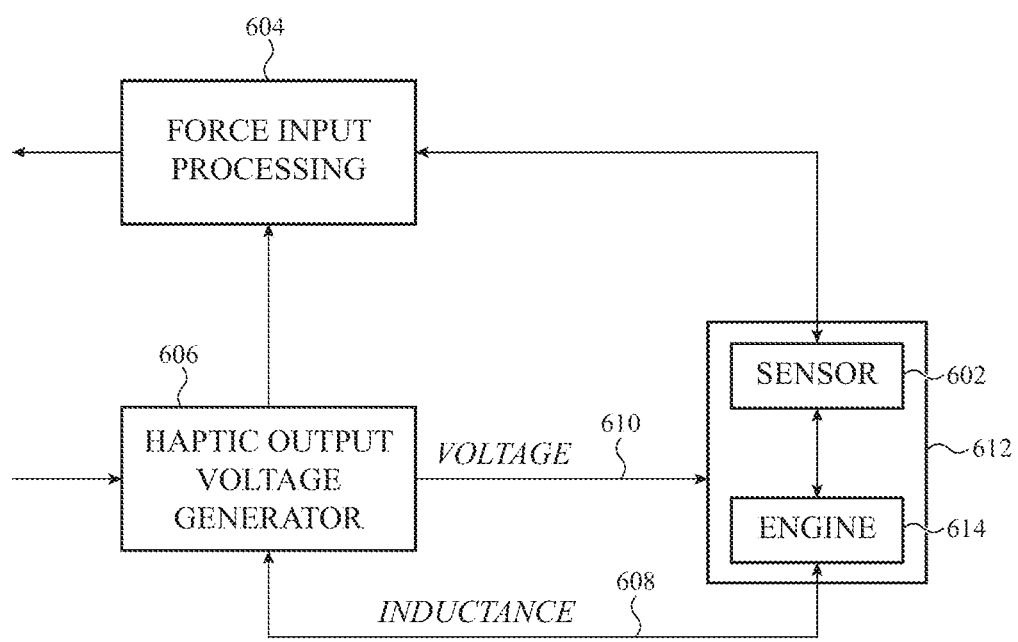
FIG. 6 describes an example block diagram of a haptic output circuitry, such as described herein.

FIG. 6 describes an example block diagram of a haptic output circuitry, such as described herein, in accordance with some embodiments. As shown in FIG. 6, the portable electronic device 102 or 202 may include a haptic output unit 612. The haptic output unit 612 may include a sensor 602, which may be a force sensor described above to determine the user input in the form of force. An output from the sensor 602 may be processed by a force input processing module 604. The force input processing input module may include the AFE circuitry 404, the ADC 406, the immutable logic core 410, and/or the master control unit 428.

Accordingly, the force input processing module 604 may process the user input and generate haptic output using haptic output voltage generator 606, which adjusts an electrical signal 610, for example, electrical voltage, required for the haptic output based on an inductance 608. The haptic output unit 612 may also include an haptic engine 614. The haptic engine 614 may generate a haptic output corresponding to the electrical voltage applied as input to the haptic engine 614.

By way of a non-limiting example, the inductance 608 may be a function of a gap change between two plates of a software-defined button 302 or 402 coupled with the sensor 602. As mentioned above, due to a change in the applied force, the gap between the two plates of the software-defined button 302 or 402 may also change. The change in the gap may also change the value of inductance or impedance, which may be used to determine whether the haptic feedback needs to be increased or decreased. Accordingly, a target displacement of components for the haptic output may be calculated. Based on the calculated target displacement, a required haptic output voltage change may be determined and applied to a haptic actuator using the haptic output voltage generator 606.

These foregoing embodiments depicted in FIG. 6, and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7:
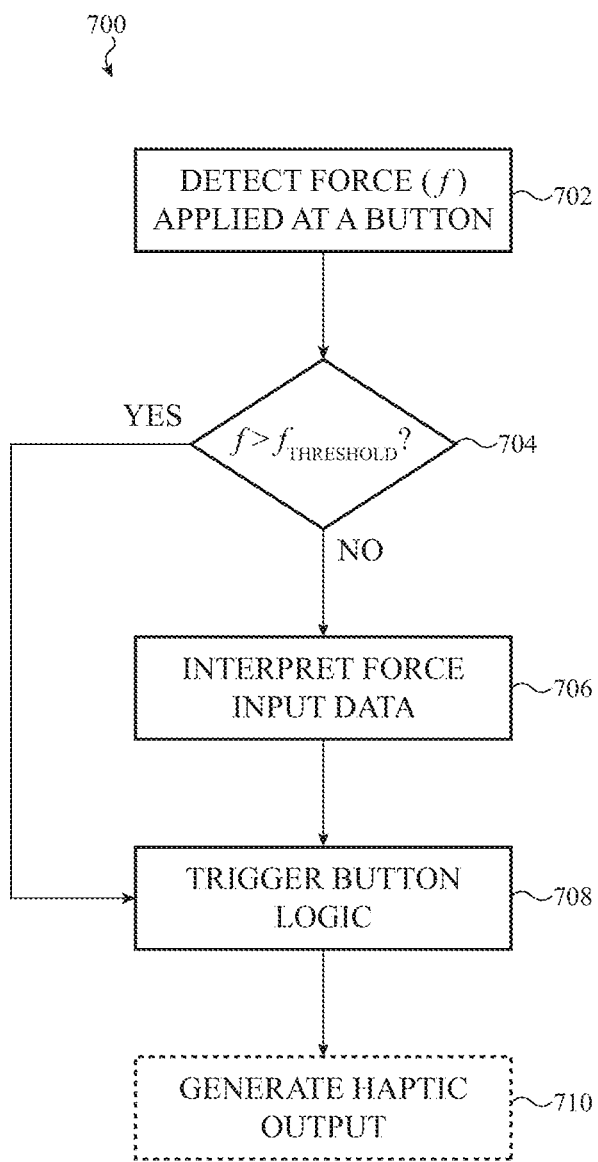
FIG. 7 depicts an example flowchart for processing user input, such as described herein.

FIG. 7 depicts an example flowchart 700 for processing user input, such as described herein, in accordance with some embodiments. At 702, the immutable logic core 308 or 410, as described herein, in accordance with some embodiments, may receive a signal from the ADC 306 or 406 as amplified by the AFE circuitry 304 or 404 in accordance with the user input at the software-defined button 302 or 402. The immutable logic core 308 or 410 then determines 704 whether force received as the user input exceeds a threshold value of force $f_{THRESHOLD}$. If force received at the user input exceeds a threshold value of force $f_{THRESHOLD}$, then an appropriate button logic may be triggered 708. By way of a non-limiting example, the appropriate button logic may include invoking the malware removal function, the power cycle function, and so on. If force received at the user input does not exceed a threshold value of force $f_{THRESHOLD}$, then received user input in the form of force may be processed by the master control unit 310 or 428, as described herein, in accordance with some embodiments. After interpreting the received force input 706, an appropriate button logic may be triggered 708.

By way of a non-limiting example, in some embodiments, following the execution of the appropriate button logic 708, a haptic output may be generated 710, as described herein, in accordance with some embodiments. The haptic output may be adaptive based on the received user input, as described herein.

Figure 8:
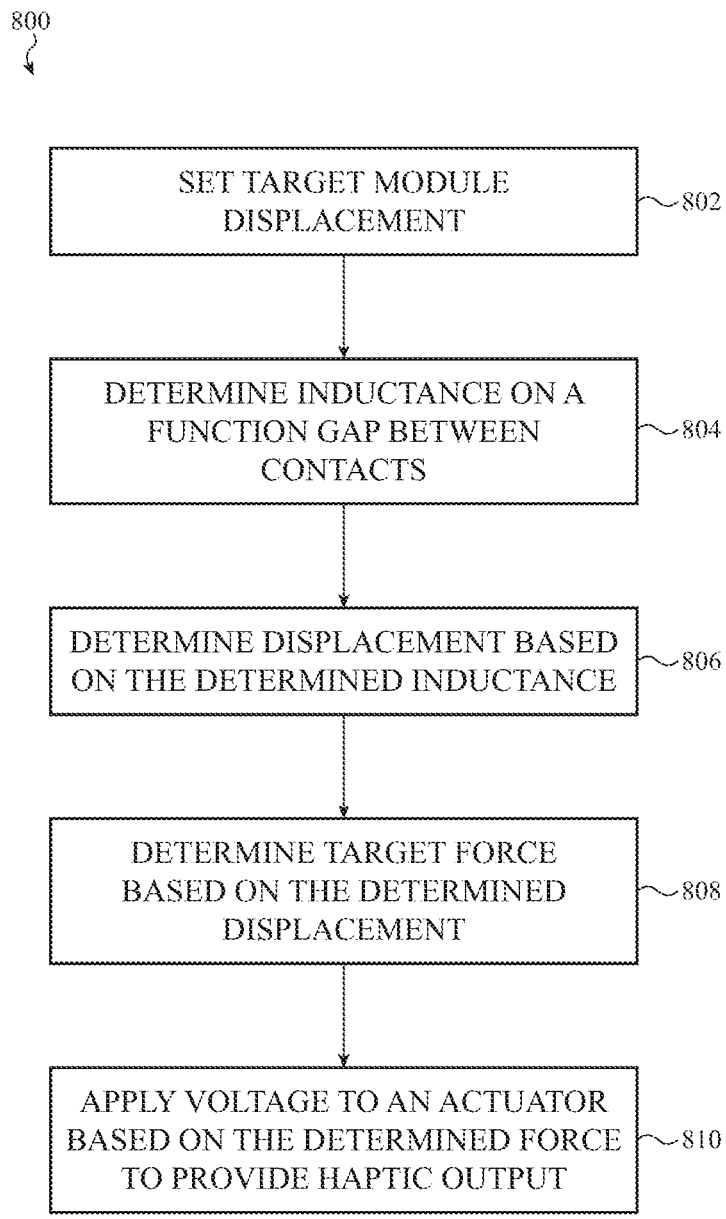
FIG. 8 depicts an example flowchart for generating a haptic output corresponding to the received user input, such as described herein.

FIG. 8 depicts an example flowchart for generating a haptic output corresponding to the received user input, such as described herein, in accordance with some embodiments. At 802, target module displacement may be set based on a configuration setting. As the user applies force to the software-defined button 302 or 402, a gap between two plates of the software-defined button 302 or 402 may change, causing a change in an inductance or impedance value of the sensor circuitry.

The inductance or impedance value may be determined 804 as a function of a gap change. The master control unit 310 or 428 may determine a displacement of haptic output element components 806 based on the received force input and the inductance as a function of a gap change, as determined at 804, to provide adaptive haptic output according to the received user input in the form of force. At 808, an output force to cause the determined displacement at 806 may be calculated, and a corresponding level of an electrical signal, for example, an electrical voltage, for the haptic output may be generated. At 810, the generated electrical voltage for the haptic output may be applied to a haptic actuator, and thereby provide the user-adaptive haptic feedback.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B. or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed and aggregated only for legitimate, agreed-upon, and reasonable uses.

As used herein, the term "processor" (along with other similar terms and phrases, including, but not limited to, "processor core") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example electronic devices or components that can include a processor core as described herein include, but are not limited to: single or multi-core processors; single or multi-thread processors; purpose-configured co-processors (e.g., graphics processing units, motion processing units, sensor processing units, and the like); volatile or nonvolatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

More generally, as described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A portable electronic device comprising:
    a housing;
    a central processor within the housing; and
    a button defined through the housing, the button comprising:
        a force sensitive structure configured to receive a force input from a user;
        analog front-end circuitry conductively coupled to the force sensitive structure of the button and configured to provide, as output, an analog signal corresponding to the force input;
        an analog-to-digital converter (ADC) configured to receive the output of the analog front-end circuitry and to provide, as output, a digital value corresponding to a magnitude of the force input; and
        an immutable logic core coupled to the ADC and configured to generate a signal to the central processor indicating that a user input event has occurred in response to the force input exceeding a threshold.

2. The portable electronic device of claim 1, wherein the immutable logic core is configured to store unmodifiable instructions.

3. The portable electronic device of claim 1, the button comprising a master control unit coupled to the immutable logic core and configured to store modifiable instructions.

4. The portable electronic device of claim 3, wherein the button is a software defined button and the master control unit is configured to define at least one operation of the software defined button.

5. The portable electronic device of claim 4, wherein the master control unit is configured to signal the immutable logic core in response to the force input.

6. The portable electronic device of claim 5, wherein the immutable logic core is configured to generate the signal to the central processor in response to the signal from the master control unit only in response to determining that output of the ADC confirms that force was applied to the button.

7. The portable electronic device of claim 5, wherein the master control unit is configured to define the threshold.

8. The portable electronic device of claim 7, wherein:
    the threshold is a first threshold associated with a start of the user input event; and
    the master control unit is configured to define a second threshold associated with an end of the user input event.

9. The portable electronic device of claim 1, the button comprising a haptic output element coupled to the immutable logic core and configured to provide a haptic output via the button to the user in response to the user input event.

10. The portable electronic device of claim 1, further comprising a haptic output element configured to determine a target force value as a function of a gap change between two plates of the button for generating a haptic output according to the received force input at the button.

11. A button for a portable electronic device, the button comprising:
    a force input sensor;
    a master control unit coupled to an immutable logic core, defining a first threshold and a second threshold, and configured to:
        generate a first signal indicating a start of a user input in response to the force input sensor providing output satisfying the first threshold; and generate a second signal indicating an end of the user input in response to the force input sensor providing output satisfying the second threshold; and the immutable logic core coupled to an output of the force input sensor and the master control unit, the immutable logic core configured to:

receive the first signal from the master control unit and, in response, verify output from the force input sensor was received, prior to generating output indicating a user input is provided to the button; and receive the second signal from the master control unit and, in response, verify output from the force input sensor was received, prior to generating output indicating the user input provided to the button has terminated.

12. The button of claim 11, comprising a haptic output element, wherein the immutable logic core is configured to provide output to drive the haptic output element.

13. The button of claim 12, wherein the immutable logic core is configured to provide output to drive the haptic output element after receiving the first signal.

14. The button of claim 12, wherein the haptic output element comprises a reluctance engine.

15. The button of claim 11, wherein the first threshold and the second threshold are stored, at least in part, in a memory of the master control unit.

16. The button of claim 11, wherein the immutable logic core is operable in a low power state and a normal state.

17. The button of claim 16, wherein:
in the low power state, the immutable logic core receives power from a first supply rail; and
in the normal state, the immutable logic core receives power from a second supply rail.

18. A method of operating a software defined button, the method comprising:

receiving, at an immutable logic core of the software defined button from a mutable logic core of the software defined button, output indicating a user input has occurred;

verifying, by the immutable logic core, that a force input was received at a force input sensor of the software defined button;

causing, by the immutable logic core of the software defined button, a haptic output to be provided in response to the user input; and in response to verifying that the force input was received, signaling by the immutable logic core a user input event has been received, and verified.

19. The method of claim 18, wherein the mutable logic core and the immutable logic core are coupled to a force sensor of the software defined button.

20. The method of claim 19, wherein the mutable logic core is configured to receive output from the force sensor and determine whether output from the force sensor satisfies a threshold prior to providing output to the immutable logic core indicating the user input has occurred.

* * * * *